United States Patent
Høffner et al.

(10) Patent No.: US 11,873,749 B2
(45) Date of Patent: Jan. 16, 2024

(54) METHOD AND APPARATUS FOR CONTROLLING TEMPERATURE IN SELECTIVE CATALYTIC REDUCTION SYSTEMS

(71) Applicant: NOBLE DRILLING A/S, Kongens Lyngby (DK)

(72) Inventors: Jan Høffner, Jyderup (DK); John Røn Pedersen, Frederikssund (DK)

(73) Assignee: NOBLE DRILLING A/S, Kgs. Lyngby (DK)

( * ) Notice: Subject to any disclaimer, the term of this patent is extended or adjusted under 35 U.S.C. 154(b) by 0 days.

(21) Appl. No.: 17/797,890

(22) PCT Filed: Jan. 25, 2021

(86) PCT No.: PCT/DK2021/050024
§ 371 (c)(1),
(2) Date: Aug. 5, 2022

(87) PCT Pub. No.: WO2021/155895
PCT Pub. Date: Aug. 12, 2021

(65) Prior Publication Data
US 2023/0081177 A1  Mar. 16, 2023

(30) Foreign Application Priority Data
Feb. 6, 2020  (DK) .......... PA 2020 00153

(51) Int. Cl.
*F01N 3/02* (2006.01)
*F02M 21/02* (2006.01)
*F01N 3/20* (2006.01)

(52) U.S. Cl.
CPC .......... *F01N 3/20* (2013.01); *F02M 21/0206* (2013.01)

(58) Field of Classification Search
CPC .......... B01D 2279/30; F01N 2610/04; F01N 3/2066; F01N 3/208; F01N 9/00; F01N 2610/144; F01N 2900/14
See application file for complete search history.

(56) References Cited

U.S. PATENT DOCUMENTS 8,815,195 B2  8/2014  Dandekar et al.
9,890,334 B2  2/2018  Harandi et al.
(Continued)

FOREIGN PATENT DOCUMENTS

DE  102017205352 A1  10/2018
EP  1574690 A1  9/2005
(Continued)

OTHER PUBLICATIONS

First Technical Office Action dated Jul. 23, 2020 and Search Report dated Jul. 22, 2020 for Danish Application No. PA 2020 00153. (8 pages).
(Continued)

*Primary Examiner* — Anthony Ayala Delgado
(74) *Attorney, Agent, or Firm* — BUCHANAN INGERSOLL & ROONEY PC

(57) ABSTRACT

An apparatus for use with a combustion apparatus and an associated Selective Catalytic Reduction ('SCR') device, comprises a temperature sensing device configured to measure the temperature of an exhaust from the combustion apparatus; and an injection unit configured to inject hydrogen into a feed of oxidizer to the combustion apparatus. An amount of hydrogen is added to an oxidiser feed of the combustion apparatus sufficient to reach a temperature in the exhaust of at least about 270° C.

13 Claims, 4 Drawing Sheets

(56) References Cited

U.S. PATENT DOCUMENTS

| | | | |
|---|---|---|---|
| 10,626,769 B2* | 4/2020 | Nilsson | F01N 13/0097 |
| 11,598,241 B2* | 3/2023 | Dea | F01N 3/2066 |
| 2003/0226349 A1* | 12/2003 | Klenk | F02D 19/0692 |
| | | | 60/285 |
| 2007/0119154 A1* | 5/2007 | Riegger | B01D 53/9431 |
| | | | 60/286 |
| 2013/0037003 A1* | 2/2013 | Sheerin | C25B 1/04 |
| | | | 123/445 |
| 2014/0156207 A1* | 6/2014 | Aiello | F01N 9/007 |
| | | | 702/34 |
| 2017/0138237 A1* | 5/2017 | Li | F02B 9/02 |
| 2018/0221819 A1* | 8/2018 | Nilsson | F01N 3/2066 |

FOREIGN PATENT DOCUMENTS

| | | |
|---|---|---|
| EP | 2412962 A1 | 2/2012 |
| EP | 3409915 A1 | 12/2018 |
| JP | 2005083280 A | 3/2005 |
| JP | 2006226167 A | 8/2006 |
| JP | 4412201 B2 | 2/2010 |
| JP | 2016070244 A | 5/2016 |
| WO | 2013021434 A1 | 2/2013 |
| WO | 2014110295 A2 | 7/2014 |
| WO | 2018185663 A1 | 10/2018 |
| WO | 2018185665 A1 | 10/2018 |

OTHER PUBLICATIONS

Second Technical Office Action for Danish Application No. PA 2020 00153 dated Feb. 18, 2021. (3 pages).

International Search Report (PCT/ISA/210) and Written Opinion (PCT/ISA/237) dated Mar. 12, 2021, by the European Patent Office as the International Searching Authority for International Application No. PCT/DK2021/05002. (13 pages).

Communication pursuant to Article 94(3) EPC, issued by the European Patent Office in European Patent Application No. 21 704 704.2, dated Aug. 17, 2023 (6 pages).

* cited by examiner

METHOD AND APPARATUS FOR CONTROLLING TEMPERATURE IN SELECTIVE CATALYTIC REDUCTION SYSTEMS

FIELD OF INVENTION

The present invention relates to methods and apparatus for controlling temperature in a Selective Catalytic Reduction ('SCR') system, and in particular, but not exclusively, in an SCR system associated with a combustion apparatus, e.g. with an engine such as a diesel engine.

BACKGROUND

Internal combustion engines involve the combustion of a fuel with an oxidiser (typically air) in a combustion chamber. Different types of internal combustion engines exist, which typically rely on the use of a particular type of fuel. For example, petrol engines use petrol as fuel, gas engines rely on the use of a gaseous fuel, whilst diesel engines rely on the use of a diesel fuel, although alternative types of fuel such as biodiesel can be used. In a diesel engine, ignition of the fuel is caused by the elevated temperature of the air in the combustion chamber due to mechanical compression during the diesel cycle.

A problem associated with diesel engines is that, due to often incomplete combustion, the exhaust often contains undesirable substances such as carbon dioxide, diesel particulate matters, and nitrogen oxides (NOx).

The release of nitrogen oxides from a diesel engine exhaust can be reduced by using Selective Catalytic Reduction ('SCR') systems. Typically, an SCR system catalyses the conversion of nitrogen oxides, usually using urea or ammonia as a reductant, into nitrogen (N2) and water (H2O). For the SCR process to convert the environmental harmful nitrogen oxides into pure nitrogen and water, the operating temperature in the SCR system should reach a minimum temperature, typically at least 280° C.-300° C., e.g. between 280° C. and 325° C., for the catalytic process to be effective. If the temperature of the engine exhaust is too low, the reduction of NOx compounds may not occur.

A problem with current engines, including, but not limited to, diesel engines, is that sufficiently high exhaust gas temperatures from the engine may not be easily reached under certain conditions or load scenarios.

A number of options have been considered to adjust of the exhaust gas temperature, for example using externally powered reheating of the exhaust gas, re-matching of the turbocharger, using an exhaust gas by-pass via waste gate or the like. However, these solutions all require significant modifications to the existing installation and/or can be prohibitively costly.

It is an object of at least one embodiment of at least one aspect of the present invention to alleviate and/or mitigate one or more problems or disadvantages associated with the prior art.

SUMMARY

According to a first aspect there is provided a method of controlling and/or regulating the temperature of an exhaust from a combustion apparatus, the method comprising controllably feeding or injecting hydrogen to an inlet of the combustion apparatus.

The combustion apparatus may comprise or may be an engine. The engine may be or may comprise an internal combustion engine. The engine may be or may comprise a diesel engine.

The combustion apparatus may comprise or may form part of a heating apparatus, e.g. a boiler.

Typically, the combustion apparatus, e.g. engine, may comprise a fuel inlet configured to receive a feed of fuel, e.g. diesel fuel, to the engine, e.g. to a combustion chamber thereof. The method may comprise feeding a fuel to the combustion apparatus, e.g. to a combustion chamber thereof.

Typically, the combustion apparatus may comprise an oxidiser inlet configured to receive a feed of an oxidiser, e.g. air, to the engine, e.g. to a combustion chamber thereof. The method may comprise feeding an oxidiser, e.g. air, to the combustion apparatus, e.g. to a combustion chamber thereof.

The method may comprise adding hydrogen to the oxidiser feed. The method may comprise feeding or injecting hydrogen during injection of the oxidiser, e.g. air, to the engine.

The method may comprise feeding an amount of hydrogen to the oxidiser sufficient to reach a temperature in the exhaust, e.g. exhaust gases, above a predetermined value and/or within a predetermined range.

The method may comprise feeding an amount of hydrogen to the oxidiser sufficient to reach a temperature in the exhaust, e.g. exhaust gases, of at least about 280° C., e.g. at least about 280° C., e.g. at least about 290° C., e.g. at least about 300° C.

The method may comprise feeding an amount of hydrogen to the oxidiser sufficient to reach a temperature in the exhaust, e.g. exhaust gases, within a range of about 270° C. to 350° C., e.g. about 280° C. to 325° C.

The method may comprise feeding an amount of hydrogen to an/the inlet of the combustion apparatus sufficient to reach a temperature in the exhaust, e.g. exhaust gases, above a predetermined value and/or within a predetermined range.

Without wishing to be bound by theory, it is believed that adding hydrogen to the feed of oxidiser, e.g. air, may cause an increase in the temperature of the exhaust compared to the temperature of the exhaust using an oxidiser free of additional hydrogen, e.g., air only. Thus, advantageously, when the temperature of the exhaust is too low to effectively convert NOx compounds in an associated SRC system, e.g., when temperature of the exhaust is below a/the desired level or range, the addition of a controlled amount or proportion of hydrogen may quickly or virtually immediately bring the exhaust temperature to a value allowing effective conversion of NOx compounds in the associated SRC system.

Advantageously also, injecting an amount of hydrogen to an/the inlet of the combustion apparatus may also improve the efficiency of the combustion apparatus, e.g. engine, and/or may reduce fuel consumption.

The method may comprise controllably feeding or injecting methanol and/or water to an inlet of the combustion apparatus.

The method may comprise controllably feeding or injecting methanol to an inlet of the engine. The method may comprise feeding an amount of methanol to an/the inlet of the combustion apparatus. Without wishing to be bound by theory, it is believed that adding methanol to the feed of oxidiser, e.g. air, may cause a decrease in the temperature of the exhaust compared to the temperature of the exhaust using an oxidiser free of additional methanol, e.g., air only. Advantageously, when the temperature of the exhaust is at or above a/the desired level or range, the addition or injection of a controlled amount or proportion of methanol and/or the increase in the proportion of methanol, may bring or may maintain the exhaust temperature to an optimum value allowing effective conversion of NOx compounds in the associated SRC system. Advantageously also, injecting an amount of methanol to an/the inlet of the combustion apparatus may also improve the efficiency of the combustion apparatus, e.g. engine, for example compared to an oxidiser feed comprising air only, thus also reducing fuel consumption.

The method may comprise controllably feeding or injecting water, e.g. steam, to an inlet of the combustion apparatus. The method may comprise feeding an amount of water, e.g. steam, to an/the inlet of the combustion apparatus. Without wishing to be bound by theory, it is believed that adding water, e.g. steam, to the feed of oxidiser, e.g. air, may cause a decrease in the temperature of the exhaust compared to the temperature of the exhaust using an oxidiser free of additional water or steam, e.g., air only. Thus, when the temperature of the exhaust is at or above a/the desired level or range, the addition of a controlled amount or proportion of water, e.g. steam, and/or the increase in the proportion of water, may bring the exhaust temperature to an optimum value allowing effective conversion of NOx compounds in the associated SRC system. Water, e.g. steam, may provide a cost effective way of reducing or limiting the increase in temperature in the exhaust.

The method may comprise controlling and/or regulating the amounts and/or ratios of hydrogen, methanol and water, relative to the feed of the oxidiser, e.g. air. By such provision, the method may improve conversion of nitrogen oxides in an associated SCR apparatus, whilst also improving and/or optimising performance and/or efficiency of the combustion apparatus, thus also reducing fuel consumption.

The method may comprise adding and/or injecting hydrogen, methanol and water to the oxidiser feed in a ratio of a:b:c, wherein a, b and c are the relative amounts of hydrogen, methanol and water added to the oxidiser feed, and each of a, b and c is ≥0. The method may comprise feeding or injecting hydrogen, methanol and/or water during injection of the oxidiser, e.g. air, to the combustion apparatus.

It will be appreciated that the temperature of the exhaust, e.g. engine exhaust, may be affected by various parameters including, for example, temperature of the oxidiser feed (e.g. air feed), engine load, and/or sulphur content of the fuel used. Thus, the amount or ratio of hydrogen, methanol and water to be injected may be influenced by external parameters such as temperature of the oxidiser feed (e.g. air feed), and/or engine load. Advantageously, the method may comprise measuring and/or monitoring the temperature of the exhaust. The method may comprise intermittently or continuously measuring and/or monitoring the temperature of the exhaust.

The method may comprise adjusting the amount and/or ratio of hydrogen, methanol and/or water added to the oxidiser feed based on the measured temperature.

The method may comprise adding or injecting hydrogen, methanol and water to the oxidiser feed in a ratio a:b:c, wherein a, b and c are the relative amounts of hydrogen, methanol and water added to the oxidiser feed. The method may comprise adjusting the ratio a:b:c based on the measured temperature.

The method may comprise adding or injecting hydrogen, methanol and water to the oxidiser feed in an amount, e.g. weight %, of x, y and z, relative to the total amount, e.g. weight of the oxidiser feed, e.g. air, wherein each of x, y and z is ≥0. The method may comprise adjusting the values x, y and z based on the measured temperature. In other words, the method may comprise adjusting the amount of hydrogen, methanol and water relative to the total oxidiser feed, based on the measured temperature of the exhaust.

The method may comprise measuring and/or monitoring the combustion process, e.g. combustion efficiency. The method may comprise intermittently or continuously monitoring the combustion process and/or measuring the combustion efficiency. The method may comprise measuring the Specific Fuel Oil Consumption ('SFOC') (typically in g/kWh), as an indicator of combustion efficiency. The method may comprise measuring combustion efficiency, e.g. SFOC, using high accuracy flowmeters (e.g., at an inlet and/or outlet of a fuel feed). The method may comprise measuring combustion efficiency by measuring one or more combustion parameters in the combustion apparatus, e.g. combustion chamber thereof, including pressure and/or temperature.

The method may comprise adjusting the amount and/or ratio of hydrogen, methanol and/or water added to the oxidiser feed based on the measured combustion efficiency. The method may comprise adding or injecting hydrogen, methanol and water to the oxidiser feed in a ratio a:b:c, wherein a, b and c are the relative amounts of hydrogen, methanol and water added to the oxidiser feed. The method may comprise adjusting the ratio a:b:c based on the measured combustion efficiency.

The method may comprise adding or injecting hydrogen, methanol and water to the oxidiser feed in an amount, e.g. weight %, of x, y and z, relative to the total amount, e.g. weight of the oxidiser feed, e.g. air, wherein each of x, y and z is ≥0. The method may comprise adjusting the values x, y and z based on the measured combustion efficiency. In other words, the method may comprise adjusting the amount of hydrogen, methanol and water relative to the total oxidiser feed, based on the measured combustion efficiency.

For example, when the combustion efficiency is relatively low, e.g. below a predetermined threshold, the method may comprise controllably feeding or injecting hydrogen and/or methanol and/or may comprise increasing the proportion of hydrogen and/or methanol to an inlet of the combustion apparatus.

When the combustion efficiency is relatively low, e.g. below a predetermined threshold, and the temperature of the exhaust is below a/the desired level or range, the method may comprise controllably feeding or injecting hydrogen and/or increasing the proportion of hydrogen, to an inlet of the combustion apparatus.

When the combustion efficiency is relatively low, e.g. below a predetermined threshold, and the temperature of the exhaust is at or above a/the desired level or range, the method may comprise controllably feeding or injecting methanol and/or increasing the proportion of methanol, to an inlet of the combustion apparatus.

When the combustion efficiency is relatively high, e.g. at or above a predetermined threshold, and the temperature of the exhaust is at or above a/the desired level or range, the method may comprise controllably feeding or injecting water and/or increasing the proportion of water, to an inlet of the combustion apparatus.

Advantageously, increasing the combustion efficiency may help reduce fuel consumption in the combustion apparatus.

The method may comprise generating and/or producing hydrogen on-demand, for example by electrolysis. Alternatively, or additionally, the method may comprise supplying hydrogen provided in one or more containers or tanks.

The method may comprise injecting methanol provided in one or more containers or tanks.

The method may comprise injecting water provided in one or more containers or tanks. The method may comprise injecting water provided via a water supply system, e.g. a mains water supply.

The method may comprise automatically controlling and/or regulating the amount and/or ratio of hydrogen, methanol and/or water, relative to the feed of the oxidiser, e.g. air, based on the measured temperature.

For example, when the temperature of the exhaust is below a/the predetermined value, the method may comprise increasing the amount or proportion of hydrogen in the feed. When the temperature of the exhaust is at or around a/the predetermined value or within a/the predetermined range, the method may comprise reducing the amount or proportion of hydrogen in the feed and/or stopping the addition of hydrogen in the feed, and/or the method may comprise increasing the amount or proportion of methanol and/or water in the feed.

When the temperature of the exhaust is above a predetermined value or above a/the predetermined range, the method may comprise increasing the amount of methanol and/or water in the feed.

The method may comprise automatically controlling and/or regulating the amount and/or ratio of hydrogen, methanol and/or water, relative to the feed of the oxidiser, e.g. air, based on the measured temperature and/or based on the measured combustion efficiency.

The method may comprise manually controlling and/or regulating the amount and/or ratio of hydrogen, methanol and/or water, relative to the feed of the oxidiser, e.g. air, based on the measured temperature and/or based on the measured combustion efficiency.

According to a second aspect there is provided a method of controlling and/or regulating the temperature of an exhaust from an combustion apparatus, the method comprising controllably feeding or injecting a mixture of hydrogen, methanol and water to an inlet of the combustion apparatus, wherein the ratio of hydrogen, methanol and water is a:b:c, each of a, b and c being ≥0, the method comprising controlling and/or regulating the amount of hydrogen, methanol and water, and/or the ratios a:b:c, so as to control and/or regulate the temperature of the exhaust and the efficiency of the combustion apparatus.

The features described in relation to the method according to the first aspect may apply in relation to the method according to the second aspect, and are not repeated here merely for brevity.

According to a third aspect there is provided an apparatus for use with a combustion apparatus and an associated Selective Catalytic Reduction ('SCR') device, the apparatus comprising:

a temperature sensing device configured to measure the temperature of an exhaust from the combustion apparatus; and an injection unit configured to inject hydrogen into a feed of oxidizer to the combustion apparatus.

The combustion apparatus may comprise or may be an engine. The engine may be or may comprise an internal combustion engine. The engine may be or may comprise a diesel engine.

The combustion apparatus may comprise or may form part of a heating apparatus, e.g. a boiler.

Typically, the combustion apparatus, e.g. engine, may comprise a fuel inlet configured to receive a feed of fuel, e.g. diesel fuel, to the engine, e.g. to a combustion chamber thereof.

Typically, the combustion apparatus may comprise an oxidiser inlet configured to receive a feed of an oxidiser, e.g. air, to the engine, e.g. to a combustion chamber thereof. The method may comprise feeding an oxidiser, e.g. air, to the combustion apparatus, e.g. to a combustion chamber thereof.

The apparatus may comprise a combustion sensing device configured to monitor the combustion process and/or configured to measure the efficiency of the combustion apparatus.

The combustion sensing device may be configured to measure Specific Fuel Oil Consumption ('SFOC'), as an indicator of combustion efficiency. The combustion sensing device may comprise high accuracy flowmeters which may be associated with a fuel inlet and/or outlet, e.g. which may measure volume and/or flow rate of fuel to the combustion apparatus. The combustion sensing device may comprise one or more temperature sensors configured to measure temperature in the combustion apparatus, e.g. combustion chamber thereof. The combustion sensing device may comprise one or more pressure sensors configured to measure pressure in the combustion apparatus, e.g. combustion chamber thereof.

The apparatus may comprise a control unit configured to control operation of the injection unit.

The control unit may comprise a user interface which may display information, e.g., exhaust temperature and/or combustion efficiency.

The user interface may comprise a display, e.g. a screen. The user interface may be configured to permit a user to enter a command, and/or may comprise input elements such as one or more buttons, a touchpad screen, or the like.

The user interface and/or control unit may be connected to and/or may be in communication with one or more of the injection unit, temperature sensing device, and combustion sensing device. Advantageously, the user interface and/or control unit may be connected to and/or may be in communication with the injection unit, the temperature sensing device, and the combustion sensing device.

The control unit may comprise an automated mode in which the control unit may automatically control and/or regulate injection of hydrogen based on an input, e.g. exhaust temperature received from the temperature sensing device and/or combustion efficiency received from the combustion sensing device.

Alternatively, or additionally, the control unit may comprise a manual mode in which a user may manually control and/or regulate injection of hydrogen based on an input, e.g. exhaust temperature received from the temperature sensing device and/or combustion efficiency received from the combustion sensing device.

Conveniently, the control unit may be remotely accessible by Bluetooth™ technology, Wi-Fi technology and the like. By such provision a user may be able to control and/or operate the control unit remotely.

The injection unit may be configured to inject methanol into the feed of oxidizer to the combustion apparatus.

The injection unit may be configured to inject water, e.g. steam, into the feed of oxidizer to the combustion apparatus.

The control unit may be configured to control and/or regulate injection of hydrogen, methanol and/or water based on an input, e.g. exhaust temperature received from the temperature sensor device and combustion efficiency received from the combustion sensing device.

The control unit may comprise an automated mode in which the control unit may automatically control and/or regulate injection of hydrogen, methanol and/or water based on an input, e.g. exhaust temperature received from the temperature sensor device and combustion efficiency received from the combustion sensing device.

Alternatively, or additionally, the control unit may comprise a manual mode in which a user may manually control and/or regulate injection of hydrogen, methanol and/or water based on an input, e.g. exhaust temperature received from the temperature sensing device and combustion efficiency received from the combustion sensing device.

The injection unit may be capable of injecting hydrogen, methanol and water to the oxidiser feed in a ratio a:b:c, wherein a, b and c are the relative amounts of hydrogen, methanol and water added to the oxidiser feed.

The injection unit may be capable of injecting and/or adding hydrogen, methanol and water to the oxidiser feed in an amount, e.g. weight %, of x, y and z, relative to the total amount, e.g. weight, of the oxidiser feed, e.g. air. The control unit may be configured to adjust the values x, y and z based on an input, e.g. exhaust temperature received from the temperature sensing device and/or combustion efficiency received from the combustion sensing device.

The features described in relation to the method according to the first aspect or second aspect may apply in relation to the apparatus according to the third aspect, and are not repeated here merely for brevity.

According to a fourth aspect there is provided a system comprising:
 a combustion apparatus;
 a Selective Catalytic Reduction ('SCR') device associated with the combustion apparatus; and
 an apparatus comprising:
 a temperature sensing device configured to measure the temperature of an exhaust from the combustion apparatus; and
 an injection unit configured to inject hydrogen into a feed of oxidizer to the combustion apparatus.

The combustion apparatus may comprise or may be an engine. The engine may be or may comprise an internal combustion engine. The engine may be or may comprise a diesel engine.

The combustion apparatus may comprise or may form part of a heating apparatus, e.g. a boiler.

The apparatus may comprise a combustion sensing device configured to monitor the combustion process and/or configured to measure the efficiency of the combustion apparatus.

The injecting unit may be configured to inject methanol and/or water, e.g. steam, into the feed of oxidizer to the combustion apparatus.

The apparatus may comprise a control unit configured to control operation of the injection unit.

The control unit may be configured to control and/or regulate injection of hydrogen, methanol and/or water based on an input, e.g. exhaust temperature received from the temperature sensing device and/or combustion efficiency received from the combustion sensing device.

The apparatus may be or may comprise an apparatus according to the third aspect, the features of which are not repeated here merely for brevity.

It will be understood that the features described in relation to any aspect may equally apply in relation to any other aspect, and are not repeated merely for brevity.

BRIEF DESCRIPTION OF DRAWINGS

Embodiments of the present disclosure will now be given by way of example only, and with reference to the accompanying drawings, which are.

DETAILED DESCRIPTION OF DRAWINGS

Figure 1:
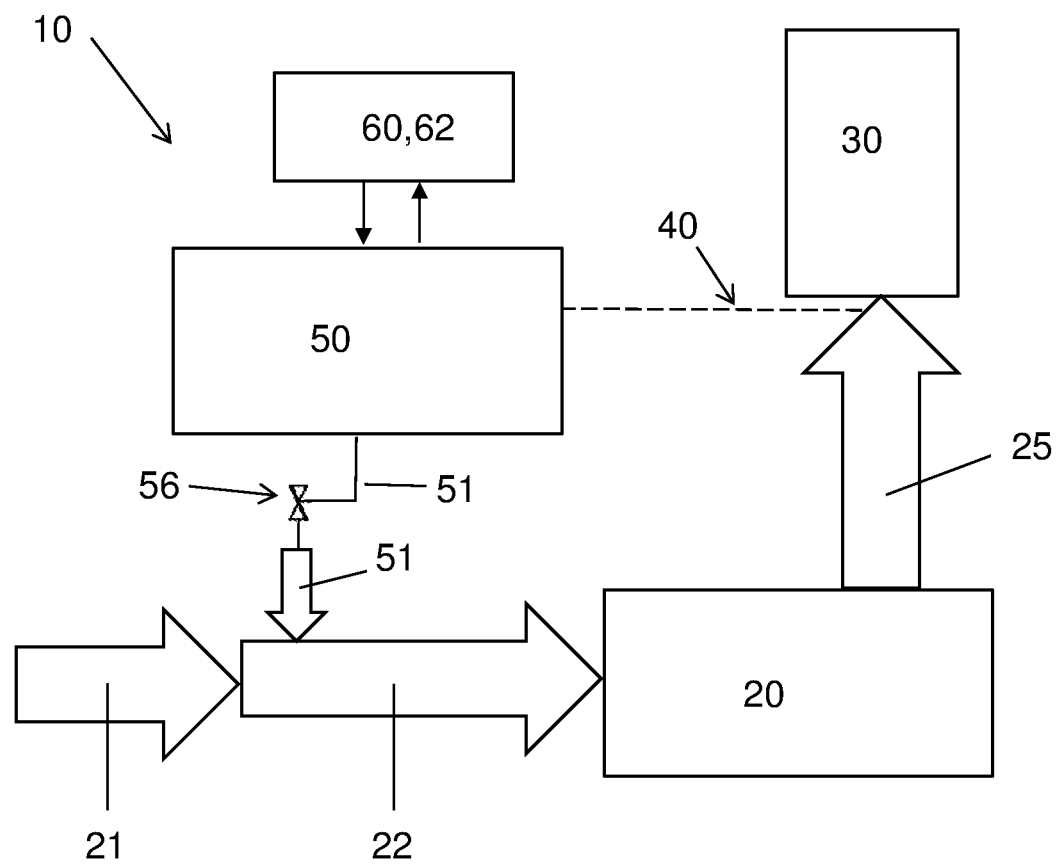
FIG. 1 illustrates an apparatus according to a first embodiment of the invention.

Referring to FIG. 1 there is shown a schematic representation perspective view of an apparatus, generally designated 10, according to a first embodiment.

The apparatus 10 is associated with a combustion apparatus 20, which in this embodiment is a diesel engine.

The combustion apparatus 20 is associated with a Selective Catalytic Reduction ('SCR') device 30. The SCR device 30 is configured to treat exhaust gases 25 from the combustion apparatus 20, and in particular to catalyse the conversion of nitrogen oxides, using urea or ammonia as a reductant, into nitrogen ($N_2$) and water ($H_2O$). In use, the combustion apparatus is fed fuel such as diesel fuel (not shown), and an oxidiser which in this embodiment is an air feed 21.

It will be appreciated that, in other embodiments, the apparatus may be used in combination with other combustion apparatus 20 which may be associated with an SCR device, including for example industrial boilers or the like, and is thus not limited for use with diesel engines specifically.

The apparatus 10 includes a temperature sensing device 40 configured to measure the temperature of the exhaust 25 from the combustion apparatus 20.

The apparatus 10 also includes an injection unit 50 configured to inject hydrogen 51 into the air feed 21 which is fed to the combustion apparatus 20. As shown in FIG. 1, the injection of hydrogen is performed before injection of air feed 21 to the combustion apparatus 20, such that, when hydrogen 51 is added and/or injected, it is mixed with the air feed 21 to provide a mixture 22 of air and hydrogen.

Typically, for the SCR device 30 to convert the environmental harmful nitrogen oxides into pure nitrogen and water effectively, the operating temperature in the SCR device should reach a minimum temperature, typically at least 280° C.-300° C., e.g. between 280° C. and 325° C., for the process to work. If the temperature of the exhaust 25 from combustion apparatus 20 is too low, the reduction of NOx compounds may not occur.

The inventors have discovered that, by adding hydrogen 51 to the feed 22, an increase in the temperature of the exhaust 25 may be obtained compared to the temperature of the exhaust 25 using an air feed 21 free of additional hydrogen.

Thus, the apparatus 10 has a control unit 60 configured to control operation of the injection unit 50 so as to control and/or regulate injection of hydrogen 51. The control unit 60 has a user interface 62 which displays information, including for example the temperature of the exhaust 25 measured by the temperature sensing device 40. The user interface 62 can also receive a input from a user s as to control the injection unit 50.

The control unit 60 is in communication with the injection unit 50 and the temperature sensing device 40.

The control unit has an automated mode in which the control unit 60 automatically controls and/or regulates injection of hydrogen 51 based on an input, e.g. exhaust temperature received from the temperature sensing device 40. The control unit 60 also has a manual mode in which a user may manually control and/or regulate injection of hydrogen 51 based on an input, e.g. exhaust temperature received from the temperature sensing device 40. In this embodiment, the control unit 60 can be switched between a manual mode and an automatic mode.

In use, when the temperature of the exhaust 25 is below a predetermined value (which may depend on the particular type of combustion apparatus 20 and/or on the SCR device 30), the control unit 60 receives a signal indicating that the temperature is below the predetermined or threshold value. This may be done by displaying the temperature on the user interface 62 and/or causing a warning signal such as a warning message, a flashing light or an alarm sound. The control unit 60 then sends a command (automatically or manually) to the injection unit 50 causing partial or full opening of valve 56 in the hydrogen supply line 51 and thus injection of hydrogen 51 in the feed 22. The hydrogen supply line 51 is connected to a source of hydrogen (not shown) which can be a hydrogens tank or container, or an on-demand hydrogen source such as a hydrolysis unit.

When the temperature of the exhaust 25 is at or around a/the predetermined value or within a/the predetermined range, the control unit 60 receives a signal indicating that the temperature is at or around a/the predetermined value or within a/the predetermined range. This may be done by displaying the temperature on the user interface 62 and/or triggering an associated signal such as a written message, a coloured light or an associated sound. The control unit 60 then sends a command (automatically or manually) to the injection unit 50 causing either partial or full closure of the valve 56 in the hydrogen supply line 51 and thus either reduced injection or interruption of the injection of hydrogen 51 in the feed 22.

The amount of hydrogen injected, e.g. the extent/degree of the opening or closure of the valve 56 may be determined and/or may be based on the extent of the variation between the exhaust temperature measured by the sensor 40 and the predetermined target temperature or temperature range for the SCR device 30.

Figure 3:
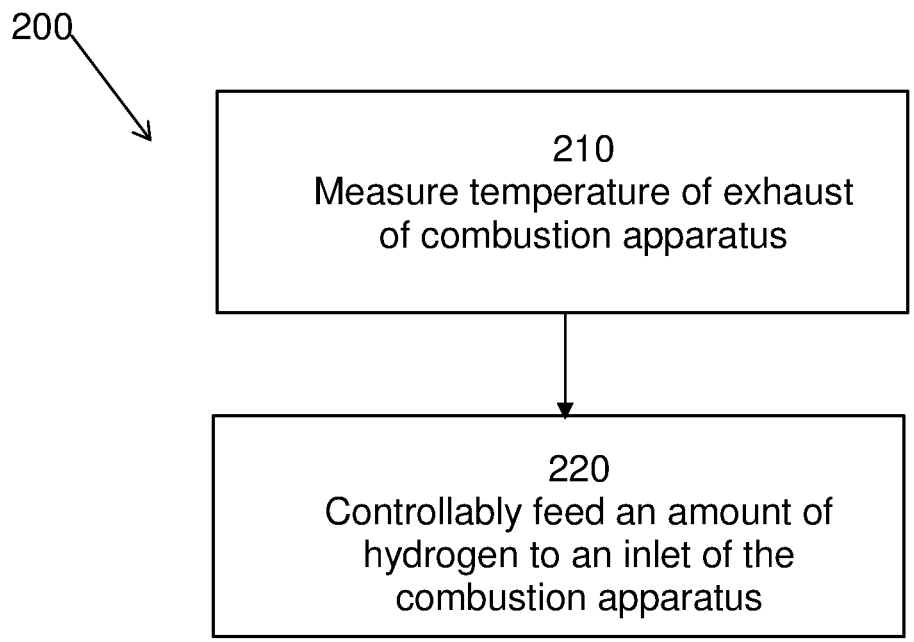
FIG. 3 illustrates a method according to one embodiment of the invention.

Thus, referring to FIG. 3, there is shown a method 200 of controlling and/or regulating the temperature of an exhaust from a combustion apparatus. The method 200 comprises measuring and/or monitoring the temperature of the exhaust 210, and controllably feeding 220 an amount of hydrogen to an inlet of the combustion apparatus sufficient to adjust the temperature in the exhaust. Advantageously, step 220 comprises feeding an amount of hydrogen to an inlet of the combustion apparatus sufficient to adjust the temperature in the exhaust, above a predetermined value and/or within a predetermined range.

Figure 2:
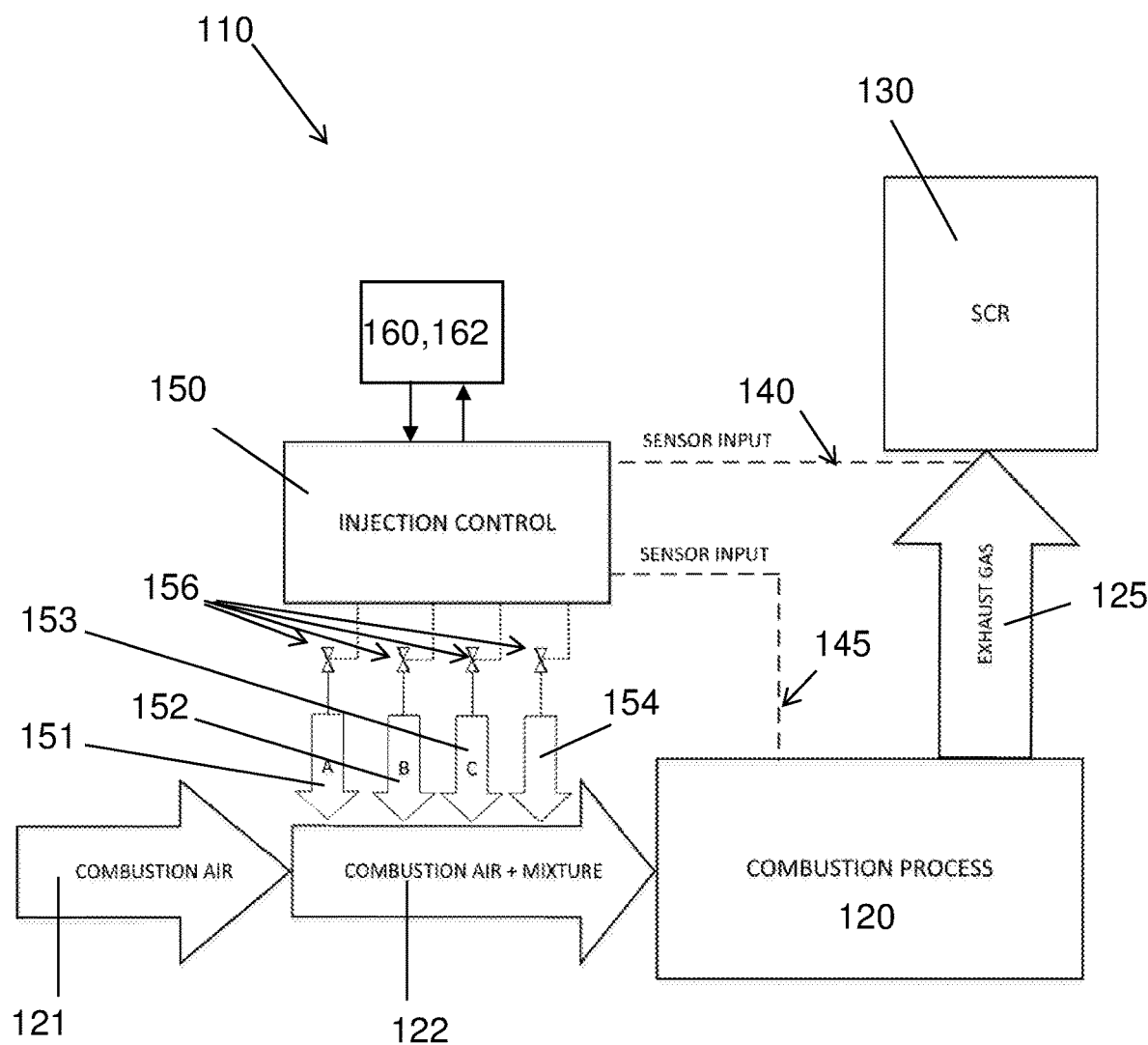
FIG. 2 illustrates an apparatus according to a second embodiment of the invention.

Referring now to FIG. 2, there is shown a perspective view of an apparatus, generally designated 110, according to a second embodiment. The apparatus is generally similar to the apparatus 10 of FIG. 1, like parts being denoted by like numerals, but incremented by '100'.

However, in this embodiment, the apparatus 110 also includes a combustion sensing device 145 configured to monitor the efficiency of the combustion apparatus 120. In this embodiment, the combustion sensing device 145 includes one or more temperature sensors configured to measure temperature in the combustion apparatus, e.g. combustion chamber thereof and one or more pressure sensors configured to measure pressure in the combustion apparatus, e.g. combustion chamber thereof. However, in other embodiments, the combustion sensing device 145 may include high accuracy flowmeters associated with a fuel inlet so as to measure volume and/or flow rate of fuel to the combustion apparatus.

The injection unit 150 is configured to inject hydrogen 151, methanol 152 and/or water 153 into the air feed 121 which is fed to the combustion apparatus 120. As shown in FIG. 2, the injection of hydrogen, methanol and water is performed before injection of air feed 121 to the combustion apparatus 120, such that, when hydrogen 151, methanol 152 and/or water 153 is/are added and/or injected, such is/are mixed with the air feed 121 to provide a mixture 122.

In FIG. 2, the apparatus 110 also includes another optional feed 154 which may be arranged to adjust any further specific parameter of the combustion process.

Each of the hydrogen supply 151, methanol supply 152 and water supply 153 is associated with a valve 156 configured to control and/or regulate the flow of hydrogen, methanol or water in its respective supply line.

The control unit 160 is configured to control operation of the injection unit 150 so as to control and/or regulate injection of hydrogen 151, methanol 152 and water 153. The user interface 162 displays information, including for example the temperature of the exhaust 125 measured by the temperature sensing device 140 and the efficiency of the combustion apparatus 120 measured by the combustion sensing device 145.

The control unit 160 is in communication with the injection unit 150 and each of the temperature sensing device 140 and combustion sensing device 145.

The control unit 160 can have an automated mode in which the control unit 160 automatically controls and/or regulates injection of hydrogen 151, methanol 152 and water 153 based on an input, e.g. exhaust temperature received from the temperature sensing device 140 and the efficiency of the combustion apparatus 120 measured by the combustion sensing device 145. The control unit 160 can also have a manual mode in which a user may manually control and/or regulate injection of hydrogen 151, methanol 152 and water 153 based on an input, e.g. exhaust temperature received from the temperature sensing device 140 and the efficiency of the combustion apparatus 120 measured by the combustion sensing device 145. In this embodiment, the control unit 160 can be switched between a manual mode and an automatic mode.

In use, the control unit 160 controls operation of the injection unit 150 such that hydrogen, methanol and water are injected or added in a ratio a:b:c, wherein a, b and c are the relative amounts of hydrogen, methanol and water added to the air feed 121 to create feed mixture 122. The injection unit 150 injects and/or adds hydrogen, methanol and water to the feed 121 in an amount, e.g. weight %, of x, y and z, relative to the total amount, e.g. weight, of the air feed 121, to create feed mixture 122.

Advantageously, the control unit 160 is configured to control and/or regulate injection of hydrogen 151, methanol 152 and/or water 153, for example by adjusting the values x, y and z, based on an input, e.g. exhaust temperature received from the temperature sensing device 140 and/or combustion efficiency received from the combustion sensing device 145.

Similarly to the apparatus described in FIG. 1, when the temperature of the exhaust 125 is below a predetermined value (which may depend on the particular type of combustion apparatus 120 and/or on the SCR device 130), the control unit 160 receives a signal indicating that the temperature is below the predetermined or threshold value. This may be done by displaying the temperature on the user interface 162 and/or causing a warning signal such as a warning message, a flashing light or an alarm sound. The control unit 160 then sends a command (automatically or manually) to the injection unit 150 causing partial or full opening of valve 156 in the hydrogen supply line 151 and thus injection of hydrogen 151 in the feed 122. The hydrogen supply line 151 is connected to a source of hydrogen (not shown) which can be a hydrogen tank or container, or an on-demand hydrogen source such as a hydrolysis unit.

When the temperature of the exhaust 125 is at or around a/the predetermined value or within a/the predetermined range, the control unit 160 receives a signal indicating that the temperature is at or around a/the predetermined value or within a/the predetermined range. This may be done by displaying the temperature on the user interface 162 and/or triggering an associated signal such as a written message, a coloured light or an associated sound. The control unit 160 then sends a command (automatically or manually) to the injection unit 150 causing either partial or full closure of the valve 156 in the hydrogen supply line 151 and thus either reduced injection or interruption of the injection of hydrogen 151 in the feed 122.

The amount of hydrogen injected, e.g. the extent/degree of the opening or closure of the valve 156 may be determined and/or may be based on the extent of the variation between the exhaust temperature measured by the sensor 140, and the predetermined target temperature or temperature range for the SCR device 130.

When the combustion efficiency measured by the combustion sensor device 145 is relatively low, e.g. below a predetermined threshold, the control unit 160 receives a signal indicating that the efficiency is below the predetermined or threshold value. This may be done by displaying the efficiency on the user interface 162 and/or causing a warning signal such as a warning message, a flashing light or an alarm sound. The control unit 160 then sends a command (automatically or manually) to the injection unit 150 causing partial or full opening of valve 156 in the hydrogen supply line 151 and/or in the methanol supply line 152 and thus injection of hydrogen 151 and/or methanol 152 in the feed 122. The methanol supply line 152 is connected to a source of methanol (not shown) which can be typically a methanol tank or container. This causes an increase in the amount and/or proportion of hydrogen and/or methanol in the feed 122 of the combustion apparatus 120.

When the combustion efficiency is relatively low, e.g. below a predetermined threshold, and the temperature of the exhaust is below a/the desired level or range, the control unit 160 sends a command (automatically or manually) to the injection unit 150 causing partial or full opening of valve 156 in the hydrogen supply line 151.

When the combustion efficiency is relatively low, e.g. below a predetermined threshold, and the temperature of the exhaust is at or above a/the desired level or range, the control unit 160 sends a command (automatically or manually) to the injection unit 150 causing partial or full opening of valve 156 in the methanol supply line 152.

When the combustion efficiency is relatively high, e.g. at or above a predetermined threshold, and the temperature of the exhaust is at or above a/the desired level or range, the control unit 160 sends a command (automatically or manually) to the injection unit 150 causing partial or full opening of valve 156 in the water supply line 153.

Thus, the control unit 160 controls the injection of each of hydrogen 151, methanol 152 and water 153, so as to control the amounts and/or ratios of hydrogen, methanol and water in the feed 122, in order to control the temperature of the exhaust 125 to optimise the SCR process in the SCR apparatus 130, and to improve or optimise efficiency in the combustion apparatus 120.

Figure 4:
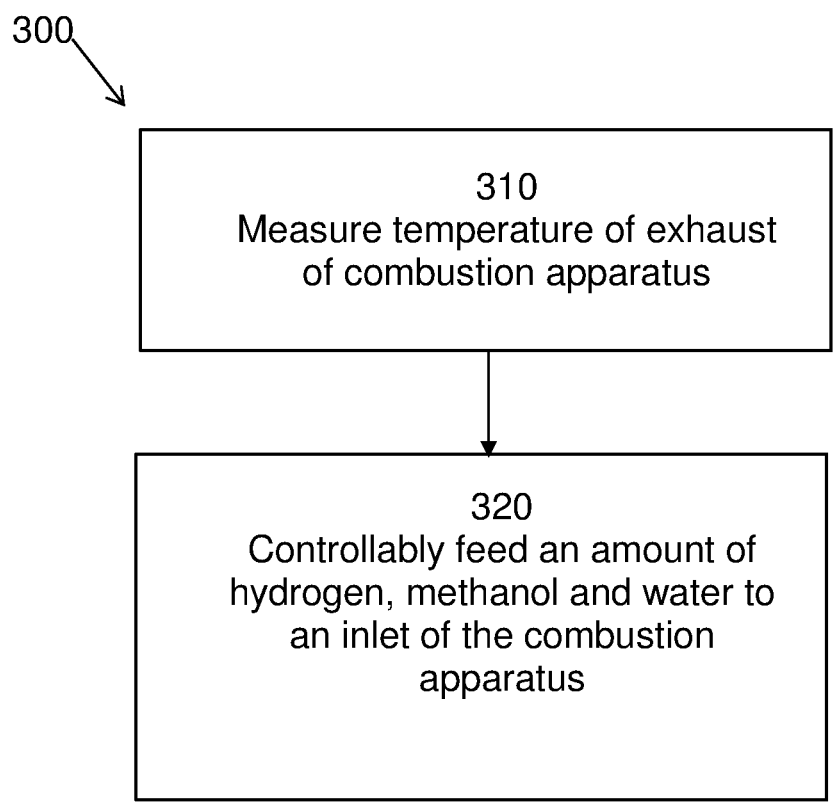
FIG. 4 illustrates a method according to another embodiment of the invention.

Referring to FIG. 4, there is shown a method 300 of controlling and/or regulating the temperature of an exhaust from a combustion apparatus. The method 300 comprises measuring and/or monitoring the temperature of the exhaust 310, and controllably feeding 320 an amount of hydrogen, methanol and water to an inlet of the combustion apparatus sufficient to adjust the temperature in the exhaust. Advantageously, step 320 comprises feeding an amount of hydrogen, methanol and water to an inlet of the combustion apparatus sufficient to adjust the temperature in the exhaust, above a predetermined value and/or within a predetermined range.

Figure 5:
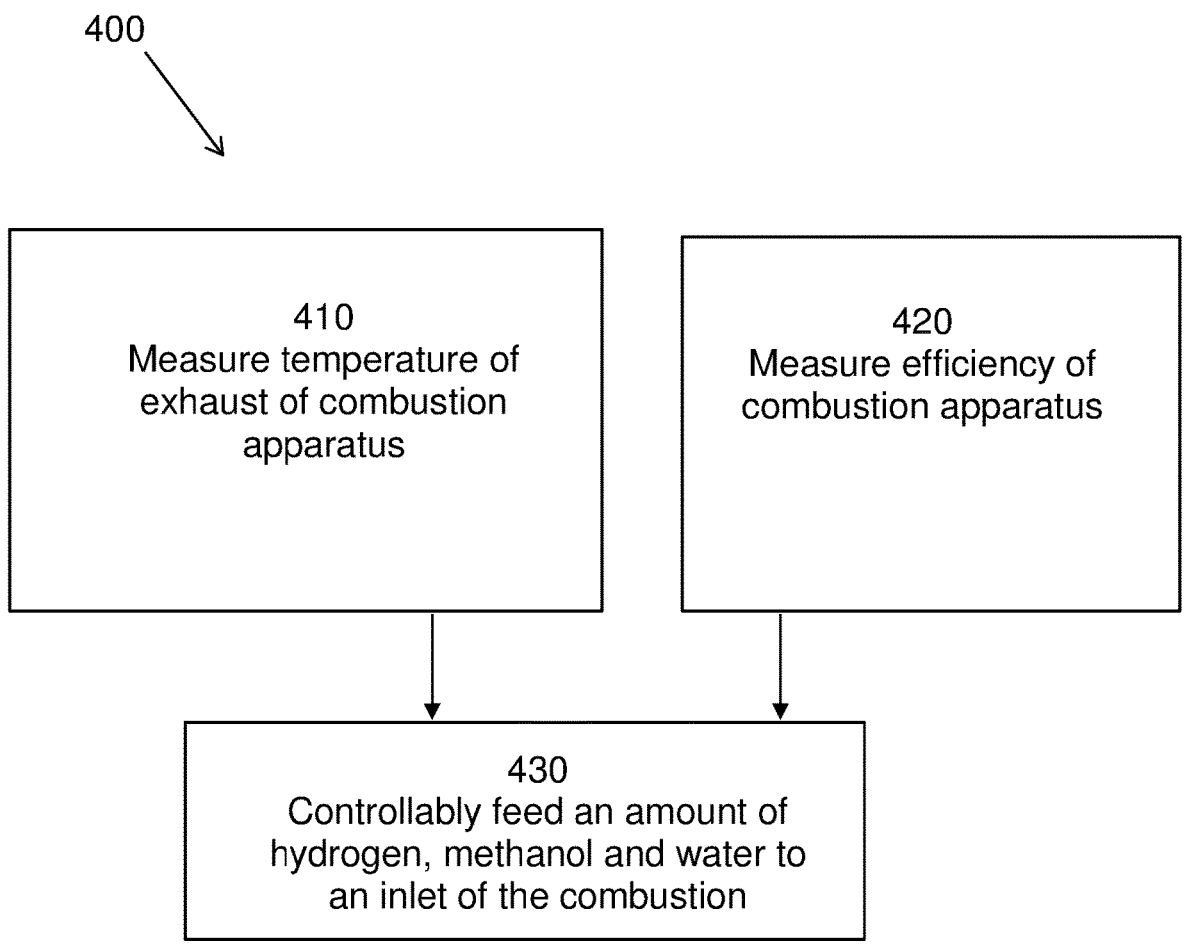
FIG. 5 illustrates a method according to yet another embodiment of the invention.

Referring now to FIG. 5, there is shown another embodiment of a method 400 for controlling and/or regulating the temperature of an exhaust from a combustion apparatus and improving efficiency of a combustion process. The method 400 comprises measuring and/or monitoring the temperature of the exhaust 410. The method also comprises measuring the combustion efficiency of the combustion process 420. The method then comprises controllably feeding 430 an amount of hydrogen, methanol and water to an inlet of the combustion apparatus sufficient to adjust the temperature in the exhaust and optimise combustion efficiency. Advantageously, step 420 comprises feeding an amount of hydrogen, methanol and water to an inlet of the combustion apparatus sufficient to adjust the temperature in the exhaust, above a predetermined value and/or within a predetermined range, and to adjust the combustion efficiency in the combustion apparatus above a predetermined value and/or within a predetermined range.

It will be appreciated that the embodiments of the invention hereinbefore described are given by way of example only and are not meant to limit the scope thereof in any way.

The invention claimed is:

1. A diesel engine comprising:
   a combustion apparatus for combustion of diesel fuel with an oxidizer,
   a Selective Catalytic Reduction (SCR) device for receiving exhaust from the combustion apparatus, the Selective Catalytic Reduction (SCR) device is configured for catalyzing conversion of nitrogen oxides in the exhaust into nitrogen and water,
   an air feed for feeding air into the combustion apparatus,
   an oxidizer feed for feeding hydrogen into the combustion apparatus,
   a temperature sensor configured to sense a temperature of the exhaust, and
   a control unit configured to control the feeding of hydrogen into the combustion apparatus,
   wherein the control unit is configured to control the feeding of hydrogen into the combustion apparatus sufficient to reach a temperature in the exhaust of at least about 270° C.,
   wherein the oxidizer feed is a part of an injection unit, and wherein the injection unit is adapted for mixing hydrogen and air from the air feed prior to feeding to the combustion apparatus via an inlet.

2. The diesel engine according to claim 1, wherein the injection unit further comprises a methanol feed and a water feed for controllably feeding methanol and/or water to an inlet of the combustion apparatus.

3. The diesel engine according to claim 1, wherein the injection unit further comprises a methanol feed and a water feed for controllably feeding methanol and/or water to the inlet of the combustion apparatus.

4. The diesel engine according to claim 3, further comprising a combustion sensing device configured to monitor measure efficiency of the combustion apparatus, and wherein the control unit is configured to control operation of the injection unit based on input from the combustion sensing device.

5. The diesel engine according to claim 4,
wherein the control unit comprises a user interface configured to display information,
wherein the control unit is in communication with:
the injection unit,
the temperature sensor, and
the combustion sensing device; and
wherein the control unit is configured to present information on the user interface, the presented information comprises the temperature of the exhaust measured by the temperature sensor and the efficiency of the combustion apparatus measured by the combustion sensing device.

6. The diesel engine according to claim 5, wherein the presentation of information on the user interface comprises displaying the exhaust temperature on the user interface and causing a warning signal such as a warning message, a flashing light or an alarm sound.

7. The diesel engine according to claim 4,
wherein the injection unit is configured to inject methanol and/or water into the oxidizer feed; and
wherein the control unit is configured to control the injection of hydrogen, methanol and water based on an exhaust temperature measured by the temperature sensor and based on a combustion efficiency measured by the combustion sensing device.

8. The diesel engine according to claim 7, wherein that the control unit has:
an automated mode in which the control unit automatically controls and/or regulates injection of hydrogen, methanol and water based on an input including exhaust temperature received from the temperature sensor device and combustion efficiency received from the combustion sensing device; and
a manual mode in which a user may manually control and/or regulate injection of hydrogen based on an input.

9. The diesel engine according to claim 8, wherein the input is an exhaust temperature received from the temperature sensor and combustion efficiency received from the combustion sensing device, and being displayed on the user interface.

10. A method for operating a diesel engine comprising a combustion apparatus for combustion of diesel fuel with an oxidizer, and a Selective Catalytic Reduction (SCR) device for receiving exhaust from the combustion apparatus and configured for catalyzing conversion of nitrogen oxides in the exhaust into nitrogen and water, the method comprises:
feeding air to the combustion apparatus;
measuring the temperature of the exhaust from the combustion apparatus; and
controlling injection of hydrogen into the combustion apparatus;
wherein the injection of hydrogen into the combustion apparatus is controlled to be sufficient to reach a temperature in the exhaust of at least about 270° C.; and
mixing hydrogen and air from an air feed prior to feeding to the combustion apparatus via an inlet.

11. A method for operating a diesel engine comprising a combustion apparatus for combustion of diesel fuel with an oxidizer, and a Selective Catalytic Reduction (SCR) device for receiving exhaust from the combustion apparatus and configured for catalyzing conversion of nitrogen oxides in the exhaust into nitrogen and water, the method comprises:
feeding air to the combustion apparatus;
measuring the temperature of the exhaust from the combustion apparatus; and
controlling injection of hydrogen into the combustion apparatus;
wherein the injection of hydrogen into the combustion apparatus is controlled to be sufficient to reach a temperature in the exhaust of at least about 270° C.;
measuring combustion efficiency in the combustion apparatus; and
adjusting an oxidizer feed based on the measured combustion efficiency, the oxidizer feed adds a mixture of hydrogen, methanol and water to an inlet of the combustion apparatus.

12. The method according to claim 11, wherein the adjusting the amount and/or ratio of hydrogen, methanol and water added to the oxidizer feed is based on the measured temperature and on the measured combustion efficiency.

13. The method according to claim 12, wherein the ratio of hydrogen, methanol and water is a:b:c, each of a, b and c being wherein the method further comprising controlling and/or regulating the amount of hydrogen, methanol and water, and/or the ratios a:b:c, so as to control and/or regulate the temperature of the exhaust and the efficiency of the combustion apparatus.

* * * * *